(12) United States Patent
Winn et al.

(10) Patent No.: US 7,912,288 B2
(45) Date of Patent: Mar. 22, 2011

(54) OBJECT DETECTION AND RECOGNITION SYSTEM

(75) Inventors: John Winn, Cambridge (GB); Jamie Shotton, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/533,993

(22) Filed: Sep. 21, 2006

(65) Prior Publication Data

US 2008/0075367 A1    Mar. 27, 2008

(51) Int. Cl.
*G06K 9/00* (2006.01)
(52) U.S. Cl. .................. 382/181; 382/224; 382/173
(58) Field of Classification Search ............... 382/181, 382/118, 101, 224
See application file for complete search history.

(56) References Cited

U.S. PATENT DOCUMENTS

| | | | |
|---|---|---|---|
| 7,027,620 B2 | 4/2006 | Martinez | |
| 2006/0098871 A1* | 5/2006 | Szummer | 382/173 |

OTHER PUBLICATIONS

He et al: "Multiscale conditional random fields for image labeling", in Proc. IEEE, CVPR'04, 2004.*
Boykov et al: "Fast approximate energy minimization via graph cuts", IEEE Trans. vol. 23, No. 11, 2001.*
Agarwal, S. et al., "Learning a sparse representation for object detection", In European Conference on Computer Vision, 2002.
Borenstein, E. et a., "Combining top-down and bottom-up segmentation", In Proceedings IEEE workshop on Perceptual Organization in Computer Vision, CVPR 2004, 2004.
Crandall, D. et al., "Spatial priors for part-based recognition using statistical models", In CVPR, 2005.
Fergus, R. et al., "Object class recognition by unsupervised scale-invariant learning", In Computer Vision and Pattern Recognition, 2003.
Kumar, S. et al., "Discriminative random fields: A discriminative framework for contextual interaction in classification", In ICCV, 2003.
Kumar, M.P. et al., "OBJ CUT", In Proceedings of the IEEE Conference on Computer Vision and Pattern Recognition, San Diego, 2005.
Lafferty, J. et al., "Conditional random fields: Probabilistic models for segmenting and labeling sequence data", In International Conference on Machine Learning, 2001.
Leibe, B. et al., "Combined object categorization and segmentation with an implicit shape model", In ECCV 2004 Workshop om Statistical Learning in Computer Vision, May 2004.
Partially Occluded Object Recognition Using Statistical Models http://www.springerlink.com/(cqvid2eimfi5xi45pkmnrhfq)/app/home/contribution.asp?referrer=parent&backto=issue,4,5;journal,54,191;linkingpublicationresults,1:100272,1.

(Continued)

*Primary Examiner* — Samir A Ahmed
*Assistant Examiner* — Ruiping Li
(74) *Attorney, Agent, or Firm* — Lee & Hayes, PLLC

(57) ABSTRACT

During a training phase we learn parts of images which assist in the object detection and recognition task. A part is a densely represented area of an image of an object to which we assign a unique label. Parts contiguously cover an image of an object to give a part label map for that object. The parts do not necessarily correspond to semantic object parts. During the training phase a classifier is learnt which can be used to estimate belief distributions over parts for each image element of a test image. A conditional random field is used to force a global part labeling which is substantially layout-consistent and a part label map is inferred from this. By recognizing parts we enable object detection and recognition even for partially occluded objects, for multiple-objects of different classes in the same scene, for unstructured and structured objects and allowing for object deformation.

17 Claims, 11 Drawing Sheets

OTHER PUBLICATIONS

Quattoni, A. et al., "Conditional random fields for object recognition", In NIPS, 2004.

Shotton, J. et al., "Contour-based learning for object detection", In ICCV, 2005.

Williams, O. M. C. et al., "The Variational Ising Classifier (VIC) algorithm for coherently contaminated data", In Advances in Neural Information Processing Systems 17, pp. 1497-1504. MIT Press, Cambridge, MA, 2005.

Winn, J. et al., "LOCUS: Learning Object Classes with Unsupervised Segmentation", In ICCV, 2005.

* cited by examiner

| (1,1) | (2,1) | (3,1) | (4,1) | (5,1) |
|-------|-------|-------|-------|-------|
| (1,2) | (2,2) | (3,2) | (4,2) | (5,2) |
| (1,3) | (2,3) | (3,3) | (4,3) | (5,3) |

FIG. 10a

OBJECT DETECTION AND RECOGNITION SYSTEM

TECHNICAL FIELD

This description relates generally to image processing and more specifically to object detection, recognition and segmentation.

BACKGROUND

Object detection and recognition are difficult problems in the field of computer vision. Object detection involves determining the presence of one or more objects in an image of a scene. Image segmentation comprises identifying all image elements that are part of the same object in an image. Object recognition comprises assigning semantic labels to the detected objects. For example, to determine a class of objects that the object belongs to such as cars, people or buildings. Object recognition can also comprise assigning class instance labels to detected objects. For example, determining that particular image elements belong to different car instances. Object recognition may also be referred to as semantic segmentation.

There is a need to provide simple, accurate, fast and computationally inexpensive methods of object detection and recognition for many applications. In addition, it is desired to cope with partial object occlusion where an image of an object is partially obscured by the presence of one or more other objects in front of it. The objects involved in the occlusion may or may not be of the same class or class instance. Coping with partial object occlusion is difficult because some information about the partially occluded object is unavailable in the image and yet it is still required to detect and recognize the object. In addition, there is a need to cope with object deformation. That is, an object is to be recognized despite the fact that its shape will differ in different views of that object, and despite that its shape may differ from other instances from the same category of object. Also, it is required to deal with cluttered images so that objects are to be recognized in an image even if that image comprises lots of detail and other objects rather than simply an image of a single object in front of a plain area.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

During a training phase we learn parts of images which assist in the object detection and recognition task. A part is a densely represented area of an image of an object to which we assign a unique label. Parts contiguously cover an image of an object to give a part label map for that object. The parts do not necessarily correspond to semantic object parts. During the training phase a classifier is learnt which can be used to estimate belief distributions over parts for each image element of a test image. A conditional random field is used to force a global part labeling which is substantially layout-consistent and a part label map is inferred from this. By recognizing parts we enable object detection and recognition even for partially occluded objects, for multiple-objects of different classes in the same scene, for unstructured and structured objects and allowing for object deformation.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 10a shows part of an initial part label map formed as a grid;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
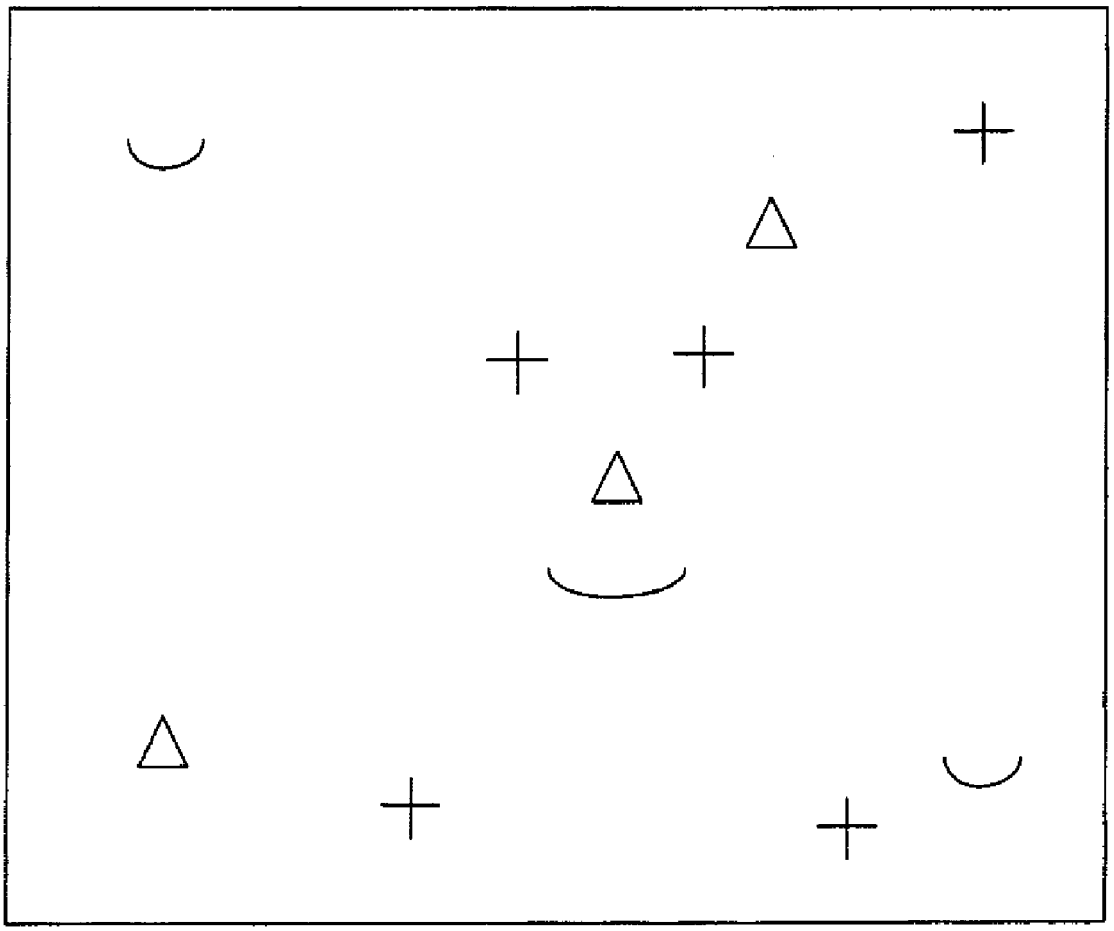
FIG. 1 is a schematic diagram of a sparse representation of an image of a face.

Some previous approaches to object detection and recognition have used sparse image representations and template based approaches as now described with reference to FIG. 1. FIG. 1 is a schematic diagram of a sparse representation of an image of a face comprising two crosses for eyes, a triangle for a nose and a curved line for a mouth. The representation also comprises other triangles, curved lines and crosses and the task is to detect and recognize the face. For example, suppose that this representation has been obtained by pre-processing a digital photograph of a face to identify areas in the image that may be potential eyes, noses or mouths. Using a pre-specified template for a face which comprises information about how many eyes, noses and mouths make up a face and which relative positions those elements should be in, a face may be detected and recognized in this representation of the image.

Figure 2:
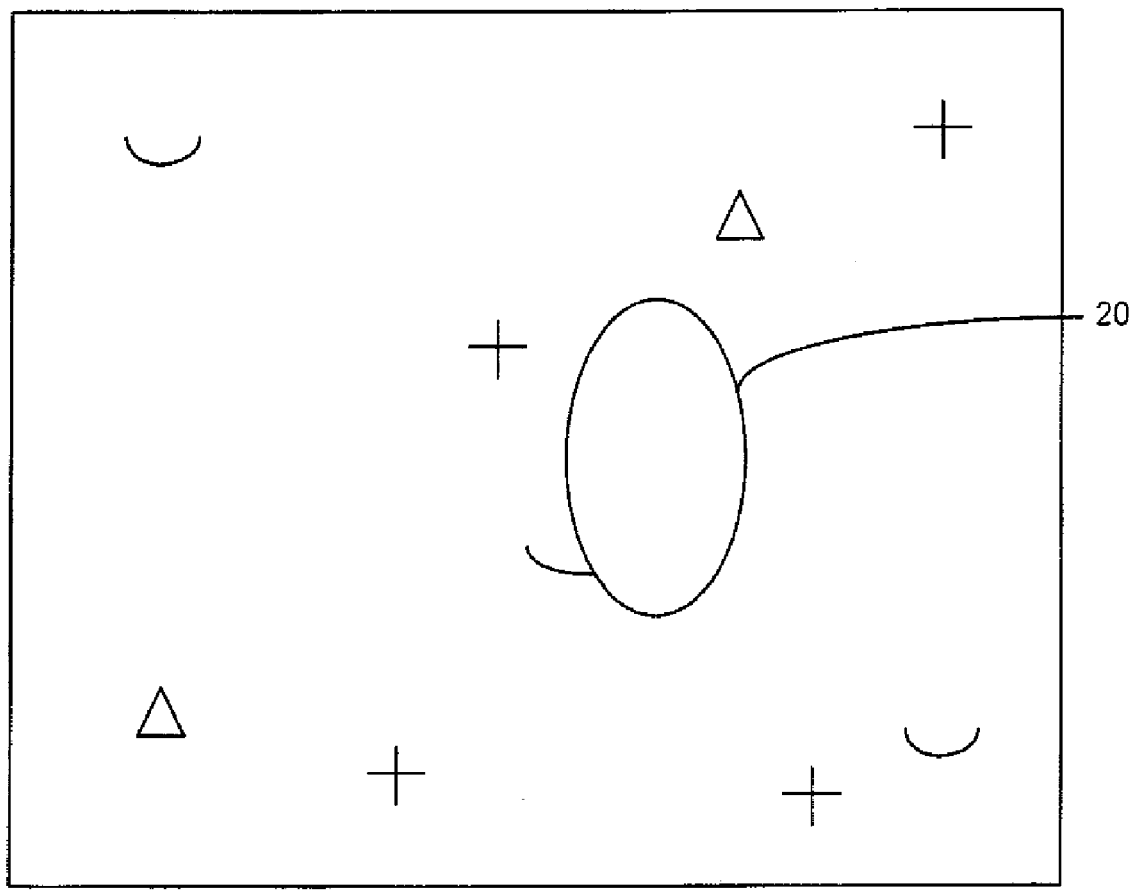
FIG. 2. is the same as FIG. 1 but with a schematic hand obscuring part of the image of the face.

Suppose that the face is partially occluded by a hand as illustrated in FIG. 2 where the oval 20 represents a hand. The template recognition process now most likely fails because only one eye and part of a mouth is available. Not enough information is available for accurate object detection and recognition in this situation.

We address this problem by using a dense representation of the image and by retaining information about the layout of the densely represented image regions. This means that when partial occlusion occurs the amount of information available to us for object detection and recognition is high and we are able to use this information effectively to obtain accurate object detection and recognition even for partially occluded objects. Having said that, our methods and systems are in no way limited to use with images of occluded objects and also provide good results where no occlusion is present.

Figure 3:
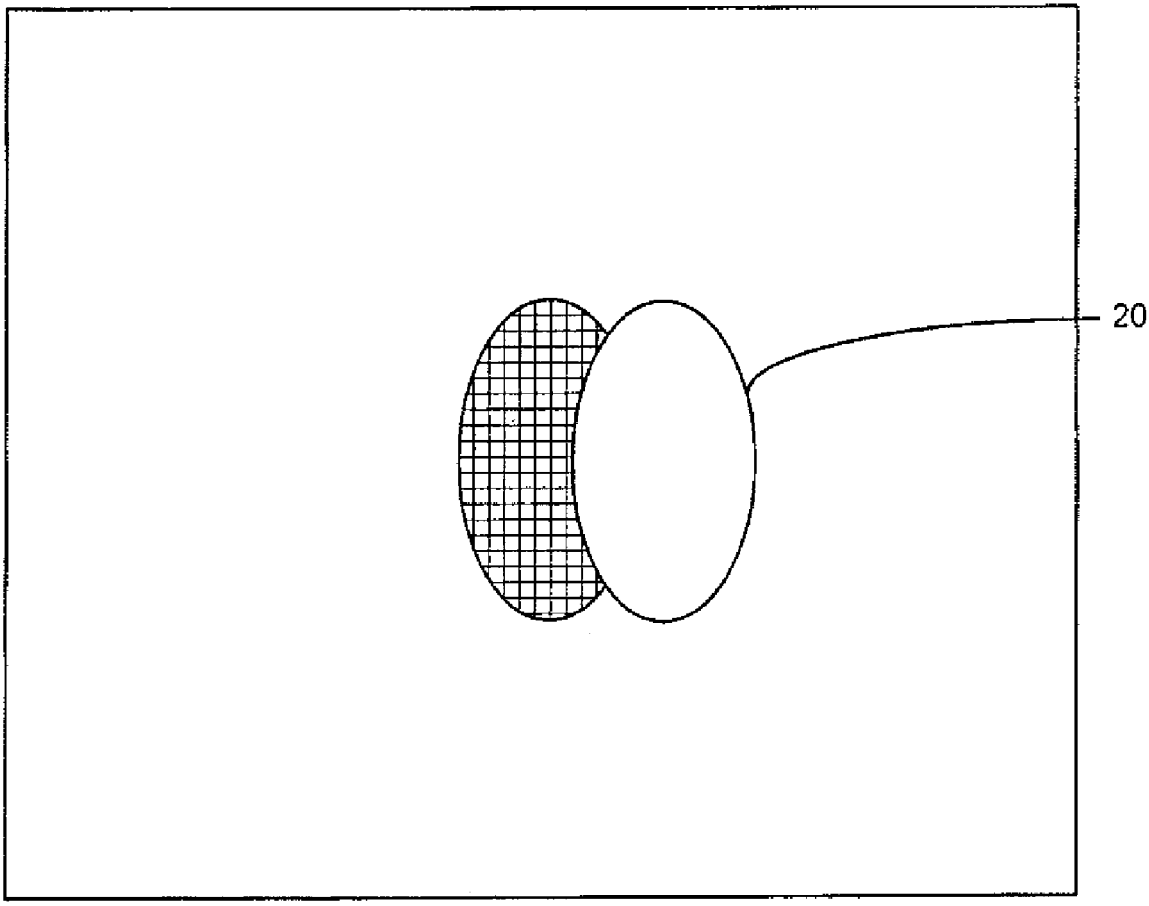
FIG. 3 is a schematic diagram of a dense representation of an image of a face partially occluded by a hand and indicating an example part labeling.

FIG. 3 is a schematic diagram of a dense representation of an image corresponding to that used to obtain FIG. 2. A hand 20 again partially occludes a face. In order to use layout information about how regions or areas of the image are arranged with respect to one another we learn information about parts of an image of an object in a training phase. We are then able to use that learnt information during a test phase to detect and recognize objects which may or may not be partially occluded.

The term "part" is used to refer to a densely represented area of an image of an object to which we assign a unique label. Together, a plurality of parts contiguously cover an image of an object to give a part label map for that object. The parts do not necessarily correspond to semantic object parts such as wheels of a car, windows of a building but may do so as a result of the learning process in some cases. As an input to our training phase an image of an object is divided into initial parts using a grid for example. It is not essential to use a grid, any method which divides the image into regions which have consistent pairwise ordering can be used. A pairwise ordering is one where the order of any pair of neighboring regions is constrained but where non neighboring regions are not constrained. For example, a sparse labeling where disconnected regions were labeled would not lead to a useful pairwise ordering on the labels, as the labeled region would not be adjacent. During training the initial parts deform as parts which assist in the object detection and recognition task are learnt.

By recognizing parts we enable object detection and recognition even for partially occluded objects. Also, there are local spatial interactions between parts that can help with detection; for example, we expect to find the nose just above the mouth on a face. Hence, we exploit local part interactions to exclude invalid hypotheses at a local level. Also, knowing the location of one part highly constrains the locations of other more distant parts. For example, knowing the locations of wheels of a car constrains where the rest of the car can be detected. By incorporating long range spatial constraints on the parts we are able to improve object detection and recognition.

Figure 10A:
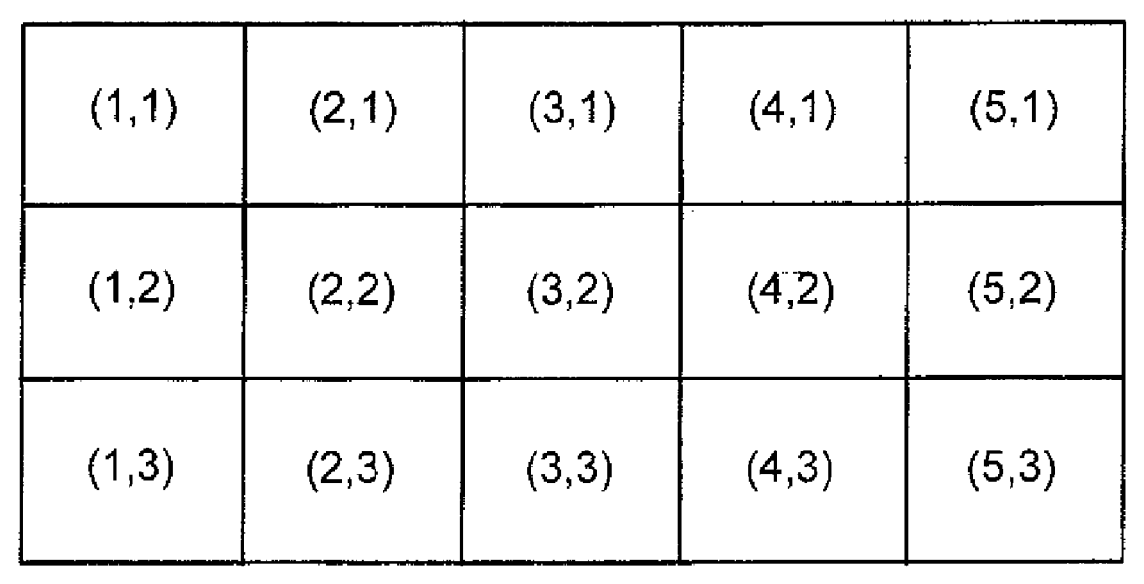
Figure 10B:
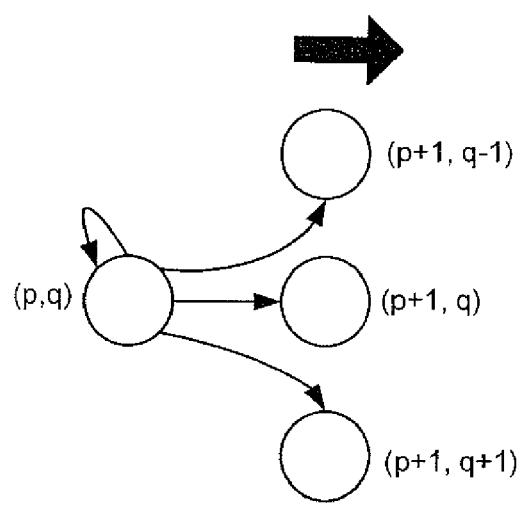
FIG. 10b to 10e show layout-consistent label pairs for pair wise links of each of four orientations.
Figure 10C:
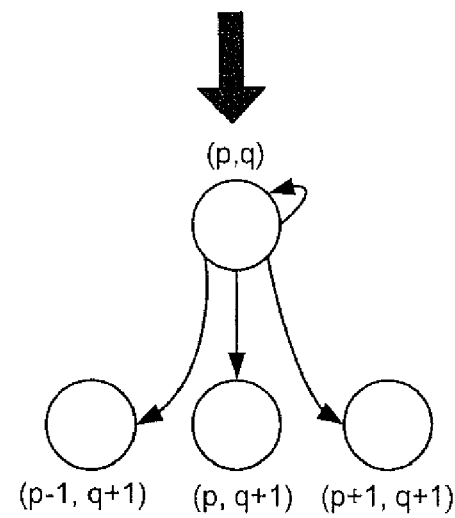
Figure 10D:
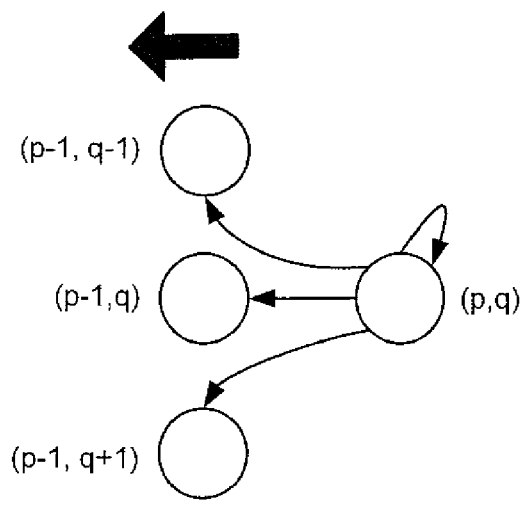
Figure 10E:
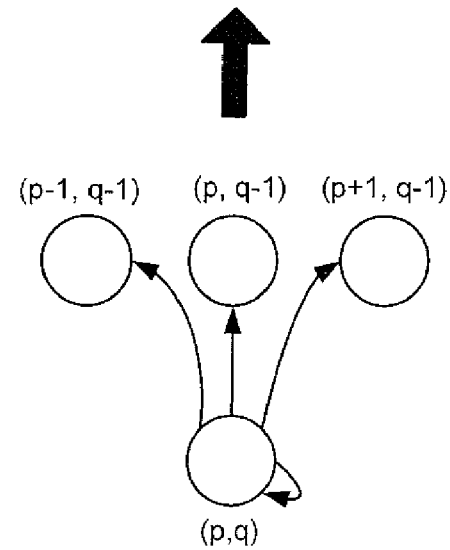

We use the term "layout consistent" to mean that the pairwise ordering of labeled parts is substantially the same as that specified in an initial division of an image of an object into parts. For example, a part label is layout-consistent with itself, and with those labels that are adjacent in the grid ordering (or other ordering used in an initial division of an image into parts) as now specified with reference to FIG. 10. FIG. 10a is a schematic diagram of an initial division of an image into parts using a regular grid. Each grid square represents a different part having a unique part label. Label numbers are shown overlaid as pairs (1,1), (2,1) etc. FIGS. 10b to 10e show layout-consistent label pairs for pairwise links of each of the four orientation (left to right, top to bottom).

Layout consistency can also be applied at a longer range than neighboring pixels. For example, we can say that labels at a particular distance should obey particular constraints e.g. that pixels separated by 10 pixels or more should not have the same part label.

Figure 4:
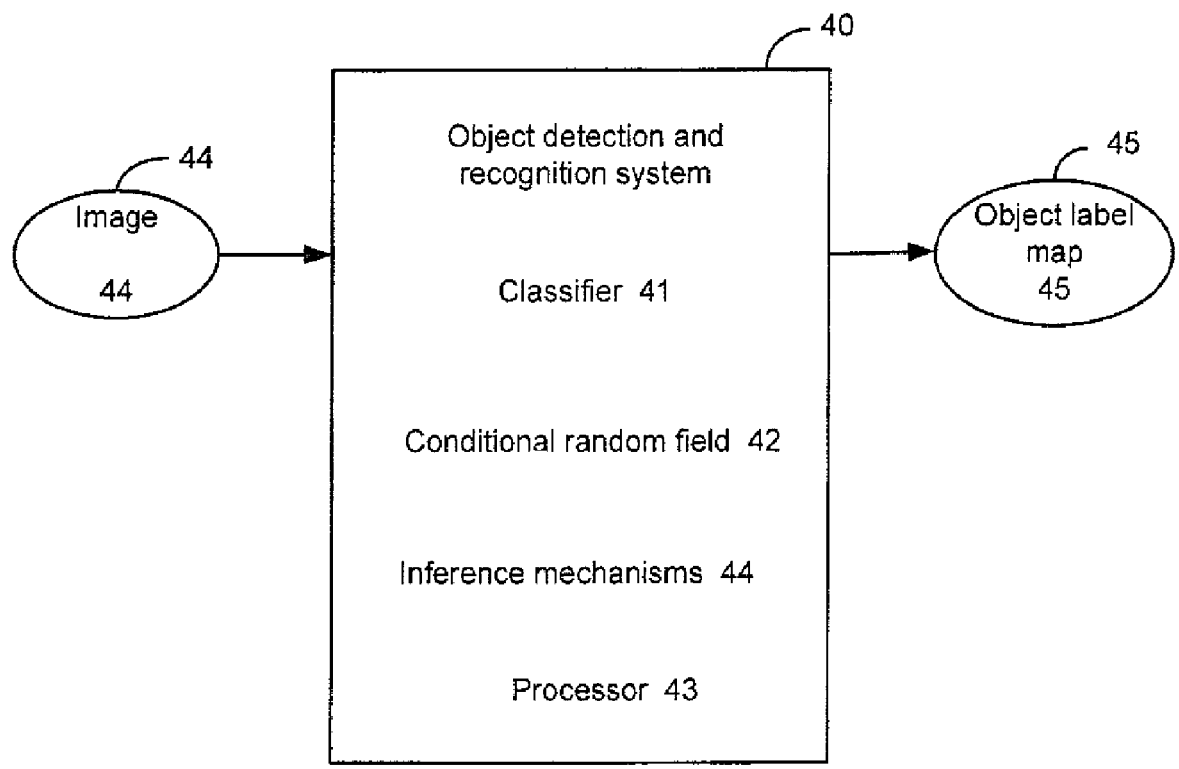
FIG. 4 is a schematic diagram of an apparatus for object detection and recognition.
Figure 5:
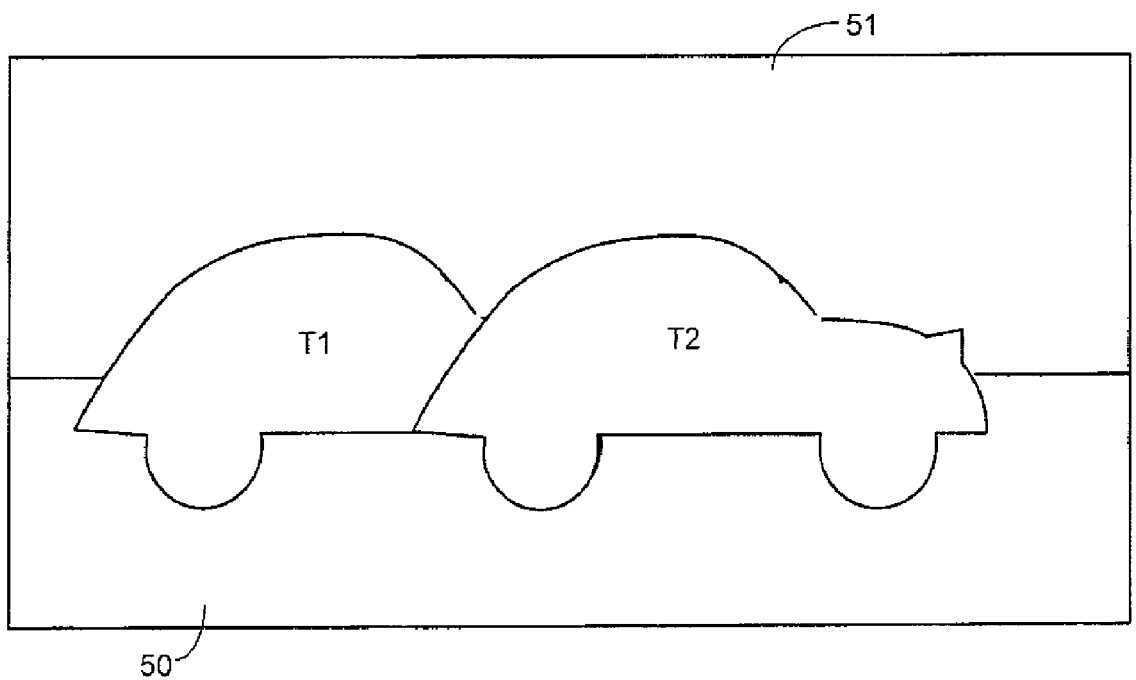
FIG. 5 is a schematic diagram of an object label map.

FIG. 4 is a high level schematic diagram of an apparatus 40 for object detection and recognition. It takes an image 44 as input which may be a digital photograph, video still or any suitable type of image. The image may be of one or more objects of the same or different classes and the objects may be structured objects such as cars or unstructured objects such as sky. Partially occluded objects may be present. The apparatus produces as output 45 an object label map comprising a label for each image element specifying which object class, and optionally class instance, that image element is assigned to. FIG. 5 is a schematic diagram of an object label map for an image of two cars of different types T1 and T2 on a road 50 with a sky 51 backdrop. Image elements such as pixels or any other suitable image elements such as clusters of pixels are labeled for example T1, T2, 51 or 50.

The apparatus 40 for object detection and recognition is provided using any suitable processor such as a computer having suitable platform software for enabling software implementing the methods described herein to be performed. The apparatus 40 comprises a classifier 41 which is any suitable type of multi class classifier able to classify image elements into two or more parts. The classifier 41 is formed during a training phase as described in more detail below. The apparatus also comprises a conditional random field 42 which takes the results of the classifier 41 and produces a part label map for the image 44 being processed. This part label map is then used to form the object label map output 45 as parts are uniquely assigned to object classes. In addition an inference mechanism 44 is provided.

Figure 6:
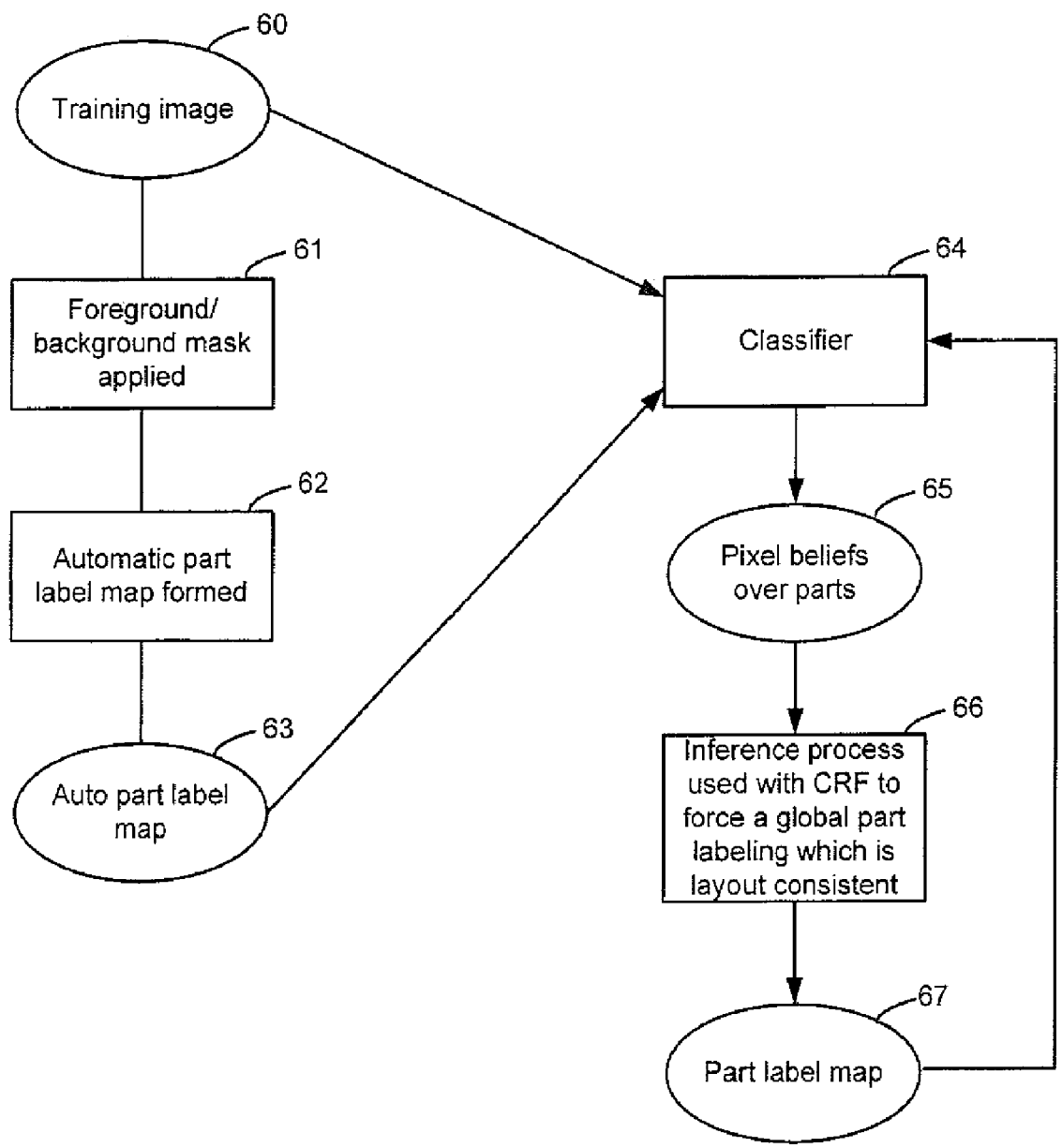
FIG. 6 is a flow diagram of a training process.

FIG. 6 is a high level schematic flow diagram of the training process. A training image 60 is taken comprising one or more objects which may be partially occluded. A pre-specified foreground/background mask is applied to the training image (box 61) which enables a background region of the image to be identified. The background region is defined as image elements (e.g. pixels) which do not belong to an identified object class. For the training images, the results of the object detection and recognition process have effectively been only partially provided in advance by hand or in any other suitable way. The foreground/background mask enables the objects in the image to be detected ready for segmentation and recognition. However, no part labelings are known in advance. As explained above, the parts do not necessarily have semantic meaning. During the test phase, when the apparatus is being used to perform object detection and recognition on previously unseen images, no foreground/background mask is used in this way.

An initial or 'default' part label map is then automatically formed on the foreground (see box 62). For example, this comprises applying a grid or other means of dividing the foreground into contiguous areas which cover the foreground; each area having a unique part label. As mentioned above, it is not essential to use a grid; any method which divides the image into regions which have consistent pair wise ordering can be used.

Figure 7:
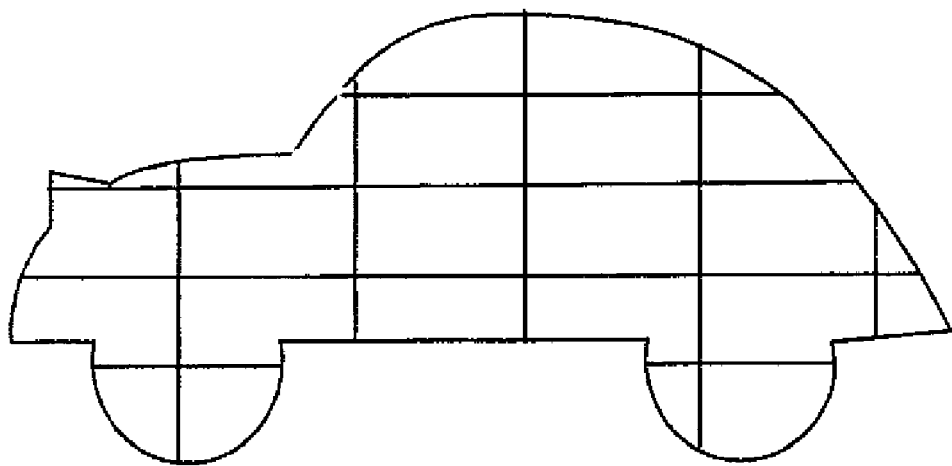
FIG. 7 is a schematic diagram of an initial part labeling and a deformed part labeling.
Figure 7:
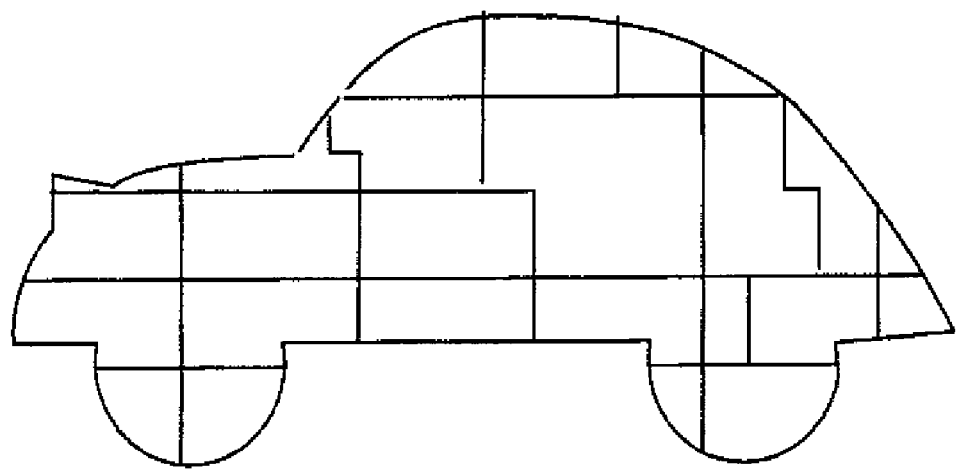

The training image 60 and its associated initial part label map 63 are made available to a classifier 64. The classifier is any suitable multi-class classifier that is able to learn a distribution over part labels for an image element, given the appearance of the surrounding image region. During this learning process the initial part labeling is deformed to produce a deformed part labeling. For example, if a grid is used this becomes deformed as illustrated schematically in FIG. 7, (The example in FIG. 7 is schematic and the parts are large scale for clarity; each part has a different part label which is not shown.) The classifier learns, for each image element in the foreground, a belief distribution over the part labels. These belief distributions represent a belief that a given image element is from a particular part. In one example, the classifier comprises a plurality of decision trees, also referred to as a decision forest, each trained on a random subset of the training data. However, it is not essential to use decision trees; any suitable type of classifier can be used.

The learnt belief distributions are applied in a conditional random field model (see box 66). More detail about the conditional random field model is given below. An inference process is carried out to apply the conditional random field to produce a substantially layout consistent part label map (box 67). This is the deformed part labeling illustrated in a schematic example in FIG. 7. Any suitable inference process can be used such as an expansion move algorithm, an annealed expansion move algorithm, belief propagation, generalized belief propagation or any other suitable type of inference process.

The inference process is used to apply the CRF. The CRF defines the constraints which are to be applied such as the layout consistent constraints and the inference process then finds the labeling which best obeys these constraints, consistent with the part appearances.

Optionally, the deformed part labeling is applied to the training image to create a new "initial" part labeling and the learning process is repeated as indicated by the arrow from box 67 to box 64 in FIG. 6. This enables the classifier to learn more consistent appearance models for each part allowing for the fact that part positions vary due to intra-class variation. An alternative approach would be to hand label part positions in the training images or to automatically label those part positions using another suitable process.

FIG. 6 illustrates a training process using a single training image 60 and is extended for a plurality of training images. For example, in order to perform object detection and recognition for objects of one class, around 50 training images may be used. However, the number of training images required varies depending on the number of possible object classes, object instances and the intra-class variability in appearance of each class.

In some embodiments, the CRF comprises pairwise potentials. These may be specified by hand to enforce the layout constraint or learned from training data using some appropriate learning process such as maximum likelihood parameter estimation.

Figure 8:
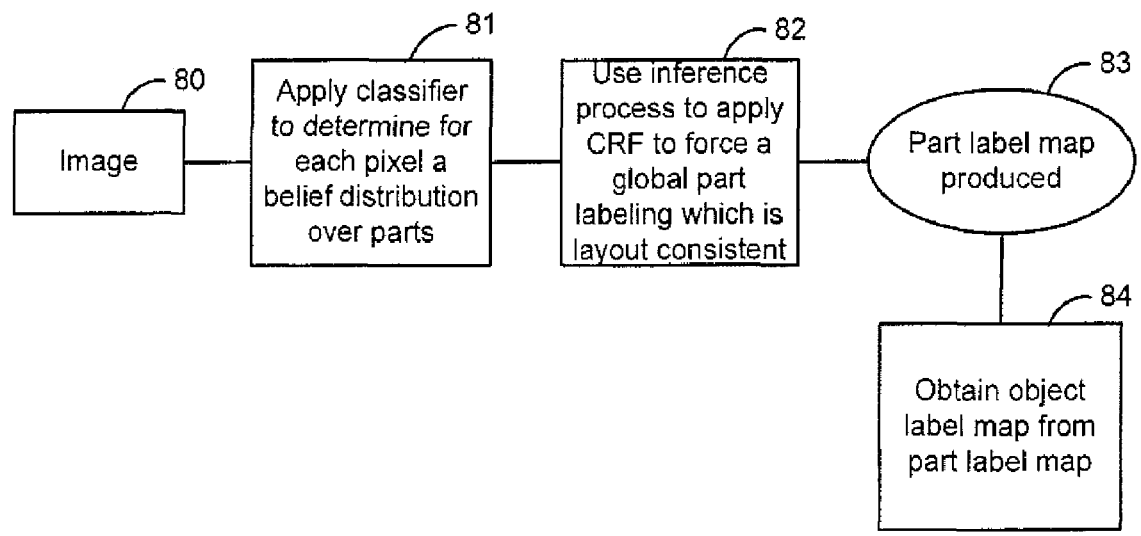
FIG. 8 is a flow diagram of a test phase.

FIG. 8 is a high level flow diagram of a method of object detection and recognition using the apparatus of FIG. 4.

A test image 80 is taken. That is an image for which it is required to carry out object detection and recognition. Using the classifier obtained during training, for each pixel (or other image element) in the test image, a belief distribution over parts is determined (see box 89). A conditional random field is then used to force a global part labeling which is substantially layout consistent (see box 82). An inference method is then used to obtain a part label map (box 83) from which an object label map (84) is obtained. Any suitable inference method may be used as for the inference during training. It is not essential to use the same inference method during the training phase as in the test phase. The process of obtaining the object label map from the part label map is the same as in the training phase.

It is not essential for the conditional random field to force a global part labeling which is absolutely layout consistent. Object boundaries will be present in the image and it is necessary to enforce layout consistency only within the boundaries of an object. Substantial layout consistency allowing for such occluding boundaries is sufficient for workable results.

More detail about an example conditional random field (CRF) is now given.

It is required to take an image x and infer a labelling for each pixel indicating both the class of object and which instance of that class the pixel belongs to. We denote the set of all image pixels as V and for each pixel $i \in V$ define a instance label $y_i \in \{0, 1, \ldots, M\}$ where the background label is indicated by $y_i=0$, and M foreground instances by $y_i \in \{1, \ldots, M\}$. For clarity, we will describe the case where only one non background class is considered at a time, though multiple classes are also possible, in which case $y_i$ labels pairs of (class, instance).

Additionally, a hidden layer of part labels $h_i$ is used. Each object instance has a separate set of H part labels so that $h_i \in \{0, 1, \ldots, H \times M\}$. These hidden variables represent the assignment of pixels to parts and are not observed during training. Parts are learned so as to densely cover the object in a coarse deformable grid.

In an example, the CRF is a Layout Consistent Random Field (LayoutCRF), which is an HRF (Hidden Random Field) with asymmetric pairwise potentials, extended with a set of discrete valued instance transformations $\{T1, \ldots, TM\}$. Each transformation T represents the translation and left/right flip of an object instance, by indexing all possible integer pixel translations for each flip orientation. This can be extended to include the rotation/scale and viewpoint of the instance. Each of these transformation variables is linked to every part label $h_i$. In an example of the CRF we use the local dependencies captured between parts rather than between instance labels. In a graphical model corresponding to this example CRF edges from part labels $h_i$ to instance labels $y_i$ represent a unique deterministic mapping from part labels to instance labels, which we denote as $y_i=y(h_i)$.

The conditional distribution for the label image y and part image h is defined as:

$$P(y, h, \{T\} \mid x; \theta) = \frac{1}{Z(\theta, x)} \prod_{i \in V} \phi_i(h_i, x; \theta) \delta(y_i \qquad (1)$$
$$= y(h_i)) \lambda_i(h_i, \{T\}; \theta) \prod_{(i,j) \in E} \psi_{ij}(h_i, h_j, x; \theta).$$

where $\theta$ represents learned parameters, and E is the set of all 4-wise neighbours between pairs of part labels. The unary potentials $\phi_i(h_i, x; \theta)$ use only local image information, and, as described below, in one example take the form of randomised decision trees. The asymmetric pairwise potentials $\psi_{ij}(h_i, h_j, x; \theta)$ encourage local and, to a certain extent, long-range compatibility between the part labels. The instance potentials $\lambda_i(h_i, \{T\}; \theta)$ encourage the correct long-range spatial layout of parts for each object instance. Finally the potentials $\delta(y_i=y(h_i))$ enforce the deterministic mapping from part labels to instance labels.

The form of the pairwise potentials $\psi_{ij}$ is now described. A common choice in CRF models is to use only symmetric pairwise potentials. However, in the methods described herein, it is possible to use symmetric and/or asymmetric pairwise potentials. In a particular embodiment we use asymmetric pairwise potentials. The use of asymmetric potentials allows the relative layout (above/below/left/right) of parts to be modelled, whilst also propagating long-range spatial constraints using only local pairwise interactions.

Figure 9:
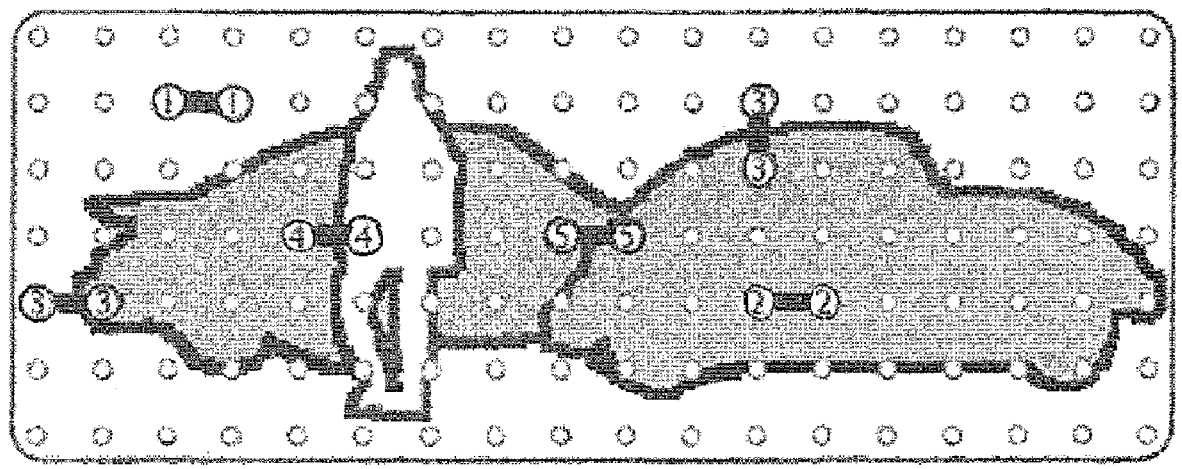
FIG. 9 shows an image with superimposed part label nodes and illustrating transition types.

FIG. 9 illustrates examples of the types of transitions which we distinguish between in the pairwise potentials. FIG. 9 is a schematic diagram of an image of two cars and a person with part label nodes represented as a grid of circles superimposed on the image. We assume that neighbouring pixels whose labels are not layout-consistent are not part of the same object. Hence, for a pair of neighbouring labels hi and hj, we define transitions to be one of the following types in a particular embodiment.

Background Both hi and hj are background labels.

Consistent Foreground Both hi and hj are layout consistent foreground labels. Note the asymmetry here: for example, if hi=a to the left of hj=b is layout consistent then (assuming a_=b) hi=b to the left of hj=a is not layout-consistent.

Object Edge One label is background, the other is a part label that lies on the object edge. Treating this type of transition specially allows to encourage object-background transitions at the true object boundary.

Class Occlusion One label is an interior foreground label, the other is the background label. This represents the case where the 'background' occludes the object.

Instance Occlusion Both are foreground labels but are not layout-consistent, with at least one label being an object edge. This represents the case where one instance of an object occludes another instance.

Inconsistent Interior Foreground Both labels are interior foreground labels which are not layout-consistent. This can only occur due to transparency or self occlusion, both of which are considered to be rare and hence this case is penalised more heavily.

The value of the pairwise potential varies according to transition type as follows:

$$-\log \psi_{ij}(h_i, h_j, x; \theta) = \begin{cases} \beta_{bg} & \text{Background} \\ 0 & \text{Consistent Foreground} \\ \beta_{oe}, e_{ij} & \text{Object Edge} \\ \beta_{co}, e_{ij} & \text{Class Occlusion} \\ \beta_{io}, e_{ij} & \text{Instance Occlusion} \\ \beta_{iif} & \text{Inconsistent Interior Foreground} \end{cases} \quad (2)$$

where cost eij is an image-based edge cost to encourage object edges to align with image boundaries, and is set to eij=e0+exp($\gamma$_xi−xj_2). The contrast term $\gamma$ is estimated separately for each image as $(2<\_x_i - x_j\_2>)^{-1}$ where $<>$ denotes a mean over all neighbouring pairs of pixels.

It is not essential to use the particular transition definitions mentioned above. A subset of these may be used, the definitions may be altered and/or additional definitions may be used.

In an example, the instance potentials are look up tables $$\lambda_i(h_i\{T_1, \ldots, T_M\}; \theta) = \tilde{P}(h_i|loc(T_{y(hi)}, i))^v \quad (3)$$

where loc(Tm, i) returns position i inverse-transformed by the transformation Tm, and v is a parameter to weight the strength of the potential. This potential encourages the correct spatial layout of parts for each object instance by gravitating parts towards their expected positions, given the transformation Ty(hi) of the instance. However, it is not essential to use lookup tables. Any suitable means of determining the instance potentials may be used.

In an example, we use an annealed layout consistent expansion move algorithm to infer the part labellings and hence (deterministically) instance labellings, as described below. First, however, we describe an example three step algorithm for inferring the number of object instances and their locations.

Step 1 Initially we have no knowledge of the number of objects and so do not distinguish between different instances. We therefore collapse all the part labels together across instances, so that we have hi $\in \{0, 1, \ldots, H\}$. Additionally we merge all the instance labels together so that yi $\in \{0, 1\}$, and remove the links from the instance transformation nodes $\{T\}$ to the part labels h. MAP inference is performed on this simplified model, resulting in a part labelling image h*. MAP inference involves finding a labelling which either exactly or approximately maximises the conditional probability of the labels, as defined in equation 1.

Step 2 We determine the number of layout-consistent regions in the labelling h* using connected component analysis, where two pixels are considered connected if they have layout-consistent part labels. This yields an initial estimate of the number of object instances M, and an initial instance labelling.

An estimate is then made of the transformations TI . . . TM for each instance label. These are estimated as arg max$\{T\}\_i\lambda_i(h_i, \{T\}; \theta)$, which can be computed separably for each instance label. To capture two possible modes corresponding to left/right flips of the object, we choose to create two instance labels for each connected component. When estimating T for each label, the first is constrained to have T facing left, the second has T facing right. Thus, M is equal to twice the number of connected components.

Step 3 We are now able to use the full model with the label set hi $\in \{0, 1, \ldots, H \times M\}$, yi $\in \{0, 1, \ldots M\}$ and including the links from $\{T\}$ to h. Using this model, we re-run the MAP inference, obtaining ^h which now distinguishes between different object instances. Typically, ^h contains part labels for only a subset of the instances. For example, normally only one of each pair of left-facing and right-facing instances is retained.

Steps 2 and 3 may optionally be iterated to refine the instance transformation and the instance labelling.

In an example, an annealed expansion move algorithm is used for approximate MAP inference of the part labels. However, it is not essential to use this algorithm; any suitable inference algorithm can be used as mentioned above.

The idea of the expansion move algorithm is to reduce the problem of maximizing a function f(h) with multiply-valued labels h to a sequence of binary-valued maximization problems. These sub-problems are called $\alpha$-expansions, and for regular energies can be efficiently solved using graph cuts as known in the art. For example as described in Y. Boykov and M. P. Jolly, "Interactive graph cuts for optimal boundary and region segmentation of objects in n-d images", Proc of IEEE ICCV., 2001 and V. Kolmogorov and R. Zabih, "What energy functions can be minimized via graph cuts?", IEEE Transactions on Pattern Analysis and Machine Intelligence, vol 26, February 2004.

Suppose that we have a current configuration (set of labels) h and a fixed label $\alpha \in U$ where U is the set of possible label values. In the $\alpha$-expansion operation, each pixel i makes a binary decision: it can either keep its old label or switch to label $\alpha$. A binary vector $s \in \{0, 1\}V$ defines the auxiliary configuration h[s] as follows for all i:

$$h_i[s] = \begin{cases} h_i & \text{if } s_i = 0 \\ \alpha & \text{if } s_i = 1 \end{cases} \quad (4)$$

This auxiliary configuration h[s] has therefore transformed the function f with multiple labels into a function of binary variables f_(s)=f(h[s]). The global maximum of this binary function can be found using a graph cut.

The expansion move algorithm starts with an initial configuration h0. Then it computes optimal $\alpha$-expansion moves for labels $\alpha$ in some order, accepting the moves only if they increase the objective function.

The algorithm is guaranteed to converge. Its output is a strong local minimum characterised by the property that no $\alpha$-expansion can increase the function f.

We wish to encourage the discovery of contiguous regions of part labels that are layout-consistent. Since any part of a regular grid is guaranteed to be layout-consistent, we choose our expansion move to be to a repeating grid of labels at a fixed offset. The total set of expansion moves is the set of possible offsets of this repeating grid (though for efficiency these are quantised to be only every 3×3 pixels or other suitable number of pixels). At each iteration, any of the pixels can choose to adopt this new labelling and a region that does so will form a local rigid grid structure. Deformations in the grid can be handled over a number of expansion moves by using labels at nearby offsets. The resultant regions will be layout-consistent and will form a deformed, rather than rigid, grid.

The set of expansion moves corresponding to all grid offsets (typically several hundred offsets) is applied in a random order. Additionally, these expansion moves are interspersed with standard $\alpha$-expansion moves for changing to the background label. Our pairwise potentials are not guaranteed to be regular, but in the rare cases where they are not regular (typically<0.5% of cases) the potential is truncated to the closest regular potential.

An annealing schedule is optionally used: during early rounds of the expansion move algorithm the pairwise potential is weakened (by raising to a power less than one). This helps to prevent the algorithm from getting stuck in local minima.

Examples of learning methods used in the training phase are now given. We learn the potentials of the model using a supervised algorithm which requires a foreground/background segmentation for each training image, but not part labellings.

For the unary potentials, we use randomised decision trees which are both straightforward to implement and very efficient. Randomised decision trees are described in V. Lepetit, P. Lagger, and P. Fua, "Randomized trees for real-time keypoint recognition", CVPR05, pages II: 775-781, 2005.

Using a set of decision trees, each trained on a random subset of the data, increases the efficiency of learning and improves generalization performance over using a single decision tree. For position i in image x, decision tree tk returns a distribution over the part labels, $\phi k_i(y_i, x; \theta)$. The set of K such decision trees are combined by simply averaging these distributions:

$$\phi_i(y_i, x; \theta) = \frac{1}{K} \sum_{k=1}^{K} \phi_i^k(y_i, x; \theta). \quad (5)$$

Each decision tree tk is a binary tree, where each non-terminal node evaluates a binary test based on one image feature. In one example, we employ two types of feature, chosen for speed: pixel intensity differences, and absolute pixel intensity differences. Each are evaluated relative to the position of pixel i being classified. Both features are constrained to only use pixel information within a box of side D, centered on pixel i. A small D value giving good recognition results of occluded objects, since this ensures invariance to occlusions which are further than D/2 pixels away. Having two types of feature allows the classifier to detect both image edges and smooth image regions. The intensity difference is compared to a learned threshold, and the left or right branch of the node is taken accordingly. At each terminal node, a distribution over part labels is learned as the histogram of all the training image pixels which have reached that node. Inferring $\phi k_i(y_i$ x; $\theta)$ simply involves traversing the tree, evaluating features relative to position i in image x, and taking the learned distribution at the terminal node reached. In this example we describe using the features of relative pixel intensity differences and absolute and absolute pixel intensity differences. However, it is possible to use any other suitable features such as linear filters, rectangular filters (computed from integral images or otherwise), convolution with image patches, image gradients or other common features and histograms over clusters of any of these features.

The trees are built in a simple, greedy fashion, where non-terminal node tests are chosen from a set of candidate features together with a set of candidate thresholds to maximise the expected gain in information. This process is halted when the best expected gain in information falls below a threshold $\epsilon$. The time taken to learn the decision trees is dominated by feature calculations and hence almost independent of the number of labels. This makes it possible to increase the number of classes and parts without unduly increasing learning time.

In order to build the unary classifier (e.g. classifier 64 of FIG. 6), a part labelling (67 of FIG. 6) is required for each training image. In one example, we want the unary classifier to learn consistent appearance models for each part, but with deformable objects the part positions vary. To avoid requiring hand-labelled part positions we propose an iterative learning scheme as follows.

In this example, the part labelling for the training images is initialised based on a dense regular grid that is sized to tightly fit the bounding box of the object and then masked with the given object segmentation. The dense grid is spatially quantised such that a part covers several pixels (on average an 8×8 pixel square for example). The unary classifiers are learned as described above, after which a new labelling is inferred for all the training images. The deformed labelling is then used to re-learn the unary classifier which can now learn a much tighter appearance distributions for each part. Two iterations of this process were found to be sufficient for good results.

The parameters for the pairwise potentials, $\beta$bg, $\beta$oe, $\beta$co, $\beta$io, $\beta$iif, v and e0 are learned, in one example, using cross-validation, by a search over a sensible range of positive values. It is also possible to use gradient-based maximum likelihood learning of the parameters or any other efficient means of learning these parameters.

In an example, the instance potential look-up tables _P(h/w) for label h at position w are learned as follows. The deformed part labelings of all training images are aligned on their segmentation mask centroids. A bounding box is placed relative to the centroid around the part labelings, just large enough to include all non-background labels. For each pixel within the bounding box, the distribution over part labels is learned by simply histogramming the deformed training image labels at that pixel. A count of one (corresponding to a weak Dirichlet prior) is added to ensure non-zero probabilities.

It is also possible to incorporate a prior on the number of instances and hence favor hypotheses where consistent disconnected regions correspond to a single occluded object. The addition of such a prior improves detection performance by removing false positives where multiple parts of the same object are given different instance labels. Also, this provides an incentive for layout-consistent disconnected regions to belong to the same object instance.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given byway of example only and that various modifications may be made by those skilled in the art. For example, many of the examples discussed above refer to processing pixels. However these examples are also applicable to other types of image elements such as groups or clusters of pixels. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of object detection and recognition comprising:
receiving an image from an input device coupled to a processor and memory to undergo object detection and recognition; and
generating, by the processor, a part label map for the received image, the part label map comprising, for each image element of the received image, a label indicating which of a plurality of parts that image element is assigned to, each part being a densely represented image area, wherein generating the part label map comprises at least:
accessing a pre-specified classifier stored in the memory and configured to estimate a belief distribution over parts for each image element of the received image,
the classifier formed during a training phase using a plurality of training images together with a mask for each training image indicating which pixels in the training image correspond to objects to be recognized and which correspond to background that is not required to be recognized,
during the training phase, forming an initial part label map for a training image by dividing the image into a plurality of parts having a consistent pair-wise ordering such that the parts contiguously cover the image;
using an inference algorithm stored in the memory to infer the part label map from a conditional random field by forcing a global part labeling which is substantially layout-consistent; and
ensuring that the parts meet constraints related to image elements, the image elements being non-immediate neighbors.

2. The computer-implemented method as claimed in claim 1 wherein the inference algorithm comprises an annealed expansion move algorithm.

3. The computer-implemented method as claimed in claim 1 wherein the inference algorithm comprises belief propagation.

4. The computer-implemented method as claimed in claim 1 wherein the conditional random field comprises a hidden layer of part labels.

5. The computer-implemented method as claimed in claim 1 which is configured for detecting and recognizing images of partially occluded objects.

6. The computer-implemented method as claimed in claim 1 which further comprises deforming the part label map for the training image during a learning process to form a deformed part labeling such that parts which assist in the object detection and recognition task are learned.

7. The computer-implemented method as claimed in claim 6 which further comprises using the deformed part labeling to form a new initial part label map for each training image and repeating the learning process.

8. One or more computer-readable storage media, which media are not a signal, comprising computer-executable instructions that, when executed by a processor, perform acts for object detection and recognition comprising:
receiving an image from an input device coupled to a processor and memory to undergo object detection and recognition, the image being of partially occluded objects;
accessing a pre-specified classifier stored in the memory arranged to estimate a belief distribution over parts for each image element of the received image,
the classifier formed during a training phase using a plurality of training images together with a mask for each training image indicating which pixels in the training image correspond to objects to be recognized and which correspond to background that is not required to be recognized, during the training phase, forming an initial part label map for a training image by dividing the image into a plurality of parts having a consistent pair-wise ordering such that the parts contiguously cover the image; and ensuring that the parts meet constraints related to image elements, the image elements being non-immediate neighbors; and applying an inference process to a conditional random field model stored in the memory to force a global part labeling which is substantially layout-consistent and thus generating a part label map from the conditional random field model for the received image, the part label map comprising, for each image element of the received image, a label indicating which of a plurality of parts the image element is assigned to, each part being a densely represented image area.

9. The one or more computer-readable storage media as claimed in claim 8, wherein using a conditional random field model comprises using such a model having a hidden layer of part labels.

10. The one or more computer-readable storage media as claimed in claim 8, wherein using a conditional random field model comprises using a plurality of decision trees.

11. An apparatus for object detection and recognition comprising:

memory and a processor;

an input device coupled to the processor and configured to receive an image to undergo object detection and recognition;

an input device coupled to the processor and configured to access a pre-specified classifier stored in the memory, the classifier configured to estimate a belief distribution over parts for each image element of the received image;

a conditional random field model stored in the memory; and an inference mechanism coupled to the processor and configured to carry out an inference process on the conditional random field model to force a global part labeling which is substantially layout-consistent and thereby generate a part label map for the received image, the part label map comprising, for each image element of the received image, a label indicating which of a plurality of parts the image element is assigned to, each part being a densely represented image area;

the processor being configured to:

form the classifier during a training phase using a plurality of training images together with a mask for each training image indicating which pixels in the training image correspond to objects to be recognized and which correspond to background that is not required to be recognized;

during the training phase, form an initial part label map for a training image by dividing the image into a plurality of parts having a consistent pair-wise ordering such that the parts contiguously cover the image; and ensure that the parts meet constraints related to image elements, the image elements being non-immediate neighbors.

12. An apparatus as claimed in claim 11 wherein the inference mechanism is arranged to carry out an annealed expansion move algorithm.

13. An apparatus as claimed in claim 11 wherein the conditional random field model comprises a hidden layer of part labels.

14. An apparatus as claimed in claim 11 wherein the classifier comprises a plurality of decision trees.

15. An apparatus as claimed in claim 11 wherein the processor is further configured to use the deformed part labeling to form a new initial part label map for each training image and repeating the learning process.

16. The one or more computer-readable storage media as claimed in claim 8, further comprising deforming the part label map for the training image during a learning process to form a deformed part labeling such that parts which assist in the object detection and recognition task are learned.

17. An apparatus as claimed in claim 11, wherein the processor is further configured to deform the part label map for the training image during a learning process to form a deformed part labeling such that parts which assist in the object detection and recognition task are learned.

* * * * *